UNITED STATES PATENT OFFICE.

WILHELM GRÜTTEFIEN, OF ELBERFELD, GERMANY, ASSIGNOR TO SYNTHETIC PATENTS CO., INC., OF NEW YORK, N. Y., A CORPORATION OF NEW YORK.

YOHIMBIN-ARSENIC PHARMACEUTICAL PRODUCT.

1,305,462.  Specification of Letters Patent.  Patented June 3, 1919.

No Drawing.  Application filed December 1, 1915.  Serial No. 64,469.

*To all whom it may concern:*

Be it known that I, WILHELM GRÜTTEFIEN, doctor of philosophy, chemist, citizen of the German Empire, residing at Elberfeld, Germany, have invented new and useful Improvements in Yohimbin-Arsenic Pharmaceutical Products, of which the following is a specification.

This invention relates to yohimbin compounds containing arsenic, and pertains particularly to the salts of yohimbin with arsenic-containing acids, which salts have been found to possess a valuable remedial action against sexual debility. The acids used as starting materials may be arsenous or arsenic acids themselves or their organic derivatives, such as the arsenic acids and the arsenated fatty acids. Thus methyl-, ethyl-, and phenyl-arsinic acids and their derivatives may be used and also derivatives of the trivalent arsenic containing an acid group, for example, arsenophenyl-glycin and halogen arseno fatty acids.

The new salts of yohimbin are chemical substances which are very stable, a property which could not have been foreseen since arsenic acid is a strong oxidizing agent. It is also well known that quinquivalent organic acid compounds are easily converted into trivalent substances but despite this fact yohimbin forms, even with arsenated fatty acids, solid, stable water-soluble salts.

A beneficial effect similar to that produced by the salts is also obtained with mixtures of yohimbin with the above mentioned arsenic derivatives.

The methods by which the new products may be obtained is illustrated by the following examples:

Example 1: 150.7 parts arsenic acid and 368 parts yohimbin are dissolved in 1500 parts water. If necessary the liquid is filtered and evaporated. The residue is mixed with acetone and the salt thus obtained is filtered off and dried at 100°. Arsenate of yohimbin forms an almost colorless powder with a melting point of 243°.

The corresponding methyl arsinic acid salt of yohimbin is obtained from 130 parts methyl arsinic acid and 368 parts yohimbin. It is an almost colorless crystalline powder with a melting point of 203°.

Example 2: 202 parts phenyl arsinic acid and 368 parts yohimbin are dissolved in 1000 parts alcohol. To this solution ether is added and the salt which is thus precipitated is filtered off after standing for some time. The salt is then dried in an exsiccator and then at higher temperature. The thus obtained phenyl arsinate of yohimbin is an almost colorless powder which melts indistinctly at about 140°.

Example 3: 462.5 parts chlor-arseno-behenolic acid and 368 parts yohimbin are dissolved in 10000 to 15000 parts acetone. If necessary the solution is filtered and the filtrate carefully evaporated. A stringy paste remains at first, which, after standing for a short time in an exsiccator becomes solid and can then be easily pulverized. The chlor-arseno-behenolate of yohimbin is a faintly colored powder which melts indistinctly at about 90° and is soluble in water, alcohol and acetone.

That these salts would be suitable for practical use was not to be anticipated since both yohimbin and arsenic exert a pronounced irritating effect upon the intestine. Contrary to the natural assumption that the simultaneous administration of both in the form of the arsenic-containing salts of the alkaloid would produce an increased irritation, it has been found that this irritation is diminished, and that their action upon the intestine differs favorably from the yohimbin salts previously employed.

I claim:—

1. The herein described new yohimbin compounds containing arsenic, which are solid, stable substances having valuable remedial properties, substantially as described.

2. The herein described new products comprising yohimbin associated with arsenic-containing acids, said products being solid, stable compounds having valuable remedial properties, substantially as described.

3. The herein described new salts of yohimbin with arsenic-containing acids, which are stable and water-soluble and possess valuable remedial properties, substantially as described.

4. The herein described new salts of yohimbin with such organic compounds as are arsenic-containing acids, said salts being stable and water soluble and possessing valuable remedial properties, substantially as described.

5. The herein described new salts of yo-

-himbin with organic derivatives of arsenic-acid, which are stable and possess valuable remedial properties, substantially as described.

6. The herein described new salts of yohimbin with fatty acid derivatives containing arsenic, which are stable and possess valuable remedial properties, substantially as described.

7. The herein described new salt of yohimbin with chlor-arseno-behenolic acid, which is stable and water soluble, and melts indistinctly at about 90° C.; substantially as described.

In testimony whereof I have hereunto set my hand in the presence of two subscribing witnesses.

WILHELM GRÜTTEFIEN. [L. S.]

Witnesses:
ALBERT NUFER,
FRANCES NUFER.